(12) United States Patent  (10) Patent No.: US 7,938,482 B1
Ludwig et al.  (45) Date of Patent: May 10, 2011

(54) ROOF ASSEMBLIES FOR VEHICLES INCLUDING MOON ROOF ASSEMBLIES

(75) Inventors: Adam Michael Ludwig, Ann Arbor, MI (US); Stephen Bie Khoe, Dearborn Heights, MI (US); Jim Scheerhorn, Holland, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 12/627,151

(22) Filed: Nov. 30, 2009

(51) Int. Cl.
*B60J 7/00* (2006.01)
(52) U.S. Cl. .................................. 296/216.07; 296/223
(58) Field of Classification Search ...... 296/216.01–224
See application file for complete search history.

(56) References Cited

U.S. PATENT DOCUMENTS

| | | |
|---|---|---|
| 5,927,784 A | 7/1999 | Vitito |
| 6,657,316 B1 | 12/2003 | Smith et al. |
| 2002/0158491 A1 | 10/2002 | Patelczyk et al. |
| 2003/0063756 A1 | 4/2003 | Geerlings et al. |
| 2003/0152088 A1 | 8/2003 | Kominami et al. |
| 2008/0272623 A1 | 11/2008 | Kadzban et al. |

*Primary Examiner* — Dennis H Pedder
(74) *Attorney, Agent, or Firm* — Dinsmore & Shohl LLP (57) ABSTRACT

A moon roof assembly for a vehicle includes an actuator-driven panel having an open position and a closed position. A moon roof trim ring at least partially surrounds the panel. The moon roof trim ring includes a control housing for supporting a control system. A control system is located in the control housing. The control system includes a control member that is exposed through an opening in the moon roof trim ring for actuating the control member and moving the panel between the open position and the closed position.

20 Claims, 7 Drawing Sheets

ROOF ASSEMBLIES FOR VEHICLES INCLUDING MOON ROOF ASSEMBLIES

TECHNICAL FIELD

The present specification generally relates to roof systems for vehicles and, more specifically, to roof systems including moon roof assemblies.

BACKGROUND

Conventional vehicle roof systems generally include a headliner forming a ceiling of the vehicle. Headliners may include layers of materials such as a foam layer covered with a cloth material. As one example, a headliner may include an outer decorative layer to provide a pleasing visual appearance. In addition, the headliner may include a layer which is intended to absorb sound to reduce noise.

Some vehicles also include a moon roof. While some may attempt to draw a distinction between a sun roof and a moon roof, as used herein, the term "moon roof" generally refers to a panel such as glass or other material that can be opened to allow air to circulate within the vehicle through an opening in the roof. Often, such moon roofs may be motor-driven and may include controls in an overhead compartment at the front of the vehicle for use in opening and closing the moon roof. However, such controls can be difficult for back seat passengers to access. Accordingly, other moon roof assemblies are desired having increased control accessibility to passengers.

SUMMARY

In one embodiment, a moon roof assembly for a vehicle includes an actuator-driven panel having an open position and a closed position. A moon roof trim ring at least partially surrounds the panel. The moon roof trim ring includes a control housing for supporting a control system. A control system is located in the control housing. The control system includes a control member that is exposed through an opening in the moon roof trim ring for actuating the control member and moving the panel between the open position and the closed position.

In another embodiment, a vehicle includes a front moon roof assembly and a rear moon roof assembly. At least one of the front moon roof assembly and the rear moon roof assembly includes a moon roof trim ring at least partially surrounding an actuator-driven panel. The moon roof trim ring includes a control housing for supporting a control system for controlling movement of the panel between an open position and a closed position.

In another embodiment, a rear moon roof assembly for a vehicle is located above a rear seating area of the vehicle. The rear moon roof assembly includes an actuator-driven panel having an open position and a closed position. A moon roof trim ring at least partially surrounds the panel. A control system includes a manually actuatable control member exposed through the moon roof trim ring for controlling movement of the panel between the open position and the closed position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to roof systems for vehicles that include one or more moon roof assemblies. The moon roof assemblies may be actuator-driven and include controls for operating the moon roof assemblies. As will be described in greater detail herein, the moon roof assemblies may include controls for operating the moon roof assemblies mounted to a moon roof trim ring for providing greater accessibility to the controls to passengers within the vehicle. Locating the controls in the trim ring may also allow passengers to easily identify the controls and recognize their use in operating the moon roof assemblies.

Figure 1:
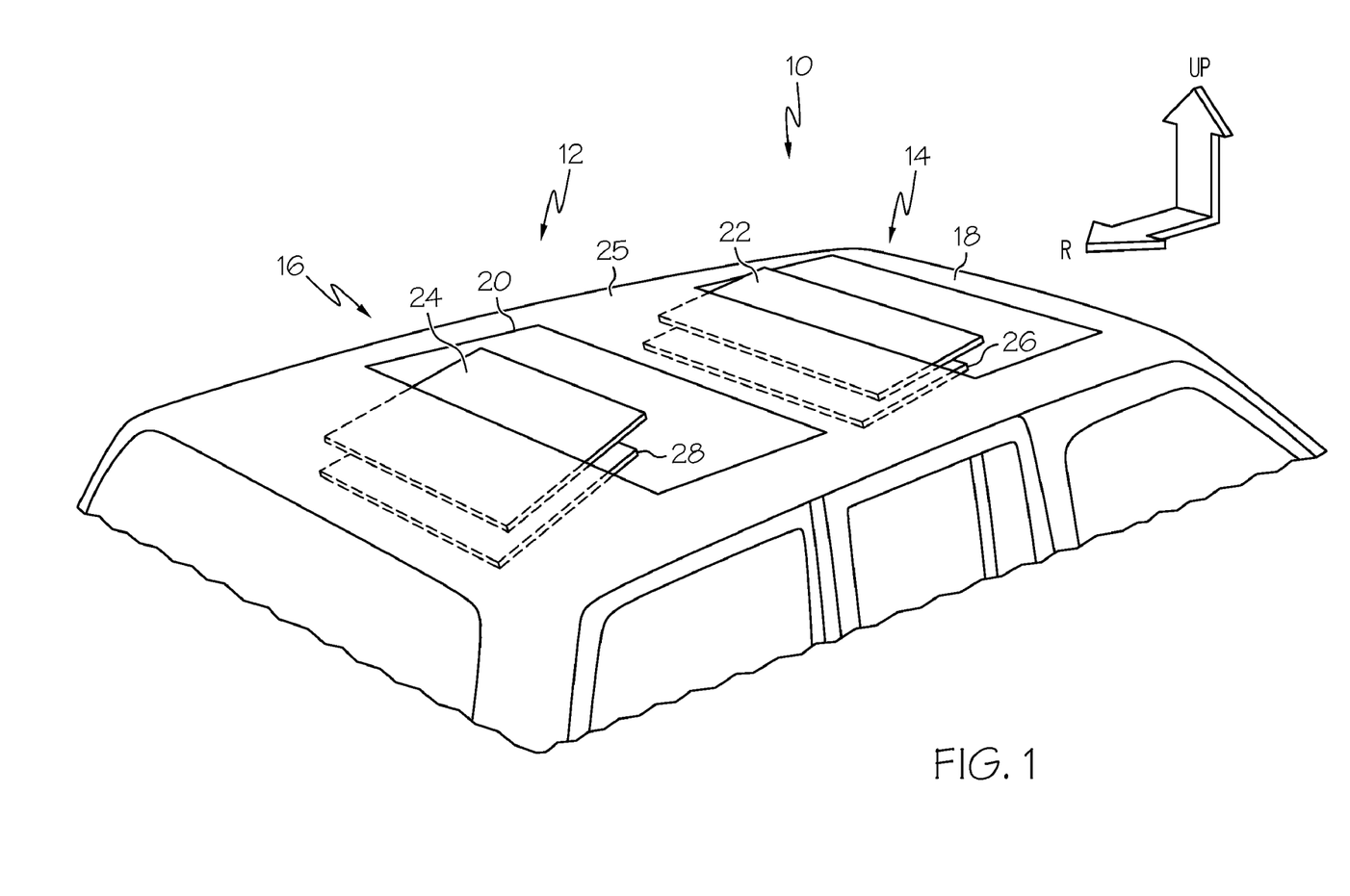
FIG. 1 is an exterior view of a roof portion of a vehicle illustrating front and rear moon roof assemblies according to one or more embodiments shown and described herein.

Referring to FIG. 1, a vehicle 10 includes a roof system 12 including a first, front moon roof assembly 14 and a second, rear moon roof assembly 16. While two moon roof assemblies 14 and 16 are depicted, there may be more or less than two moon roof assemblies. For example, there may only be one rear moon roof assembly or one front moon roof assembly. The front moon roof assembly 14 and the rear moon roof assembly 16 generally include moon roof openings 18 and 20 formed in a ceiling portion 25 of the vehicle. The moon roof openings 18 and 20 can be opened and closed by a moon roof panel 22 and 24, for example, formed of a transparent or semi-transparent material (e.g., glass, plastic, etc.) configured for viewing of the external surroundings by occupants of the vehicle. The moon roof panels 22 and 24 may slide in a longitudinal direction of the vehicle 10, for example, using an actuator such as a motor. A sunshade 26 and 28 may also be provided on the ceiling portion 25 that slides relative to the moon roof panels 22 and 24 for exposing or covering the moon roof panels 22 and 24.

Figure 2:
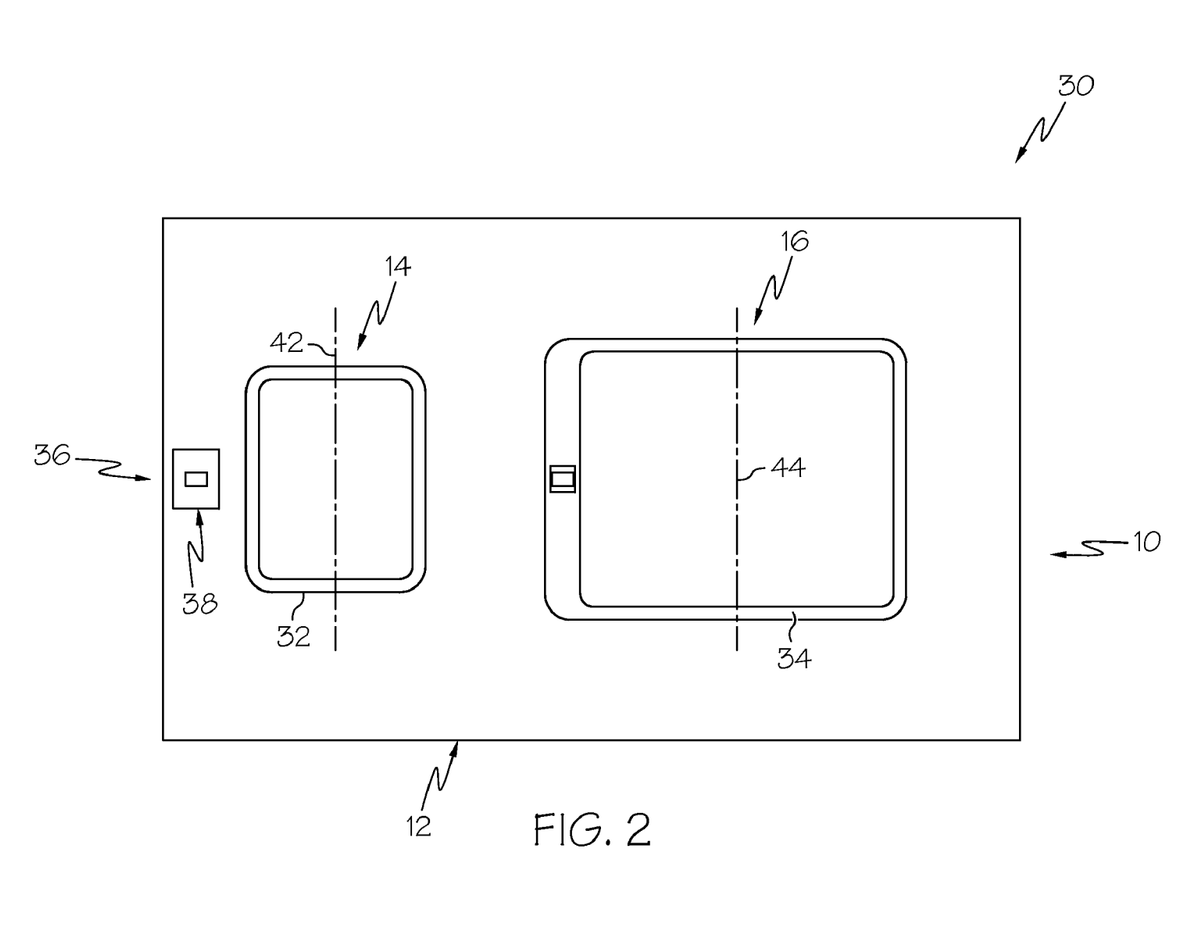
FIG. 2 illustrates an interior view of the roof portion of FIG. 1 according to one or more embodiments shown and described herein.

Referring to FIG. 2, an interior 30 of the vehicle 10 includes the roof system 12 including the front moon roof assembly 14 and the rear moon roof assembly 16. Moon roof trim rings 32 and 34 are provided about the moon roof openings 18 and 20. The moon roof trim rings 32 and 34 may provide a smooth, molded look to the front moon roof assembly 14 and the rear moon roof assembly 16, which are more aesthetically pleasing. As can be seen by FIG. 2, controls 36 for operating the front moon roof assembly 14 may be located in an overhead compartment 38, separate from the moon roof trim ring 32 at the front of the vehicle 10. Lines 42 and 44 represent front and rear hip points for passengers riding in the front seats and rear seats, respectively. As can be seen, the controls 36 and overhead compartment 38 are spaced forward from the rear occupants a distance that that is greater than a distance that the overhead compartment 38 is spaced from the front passengers. This increased distance from the line 44 to the controls 36 can result in the controls 36 being difficult to reach by the rear passengers.

Figure 3:
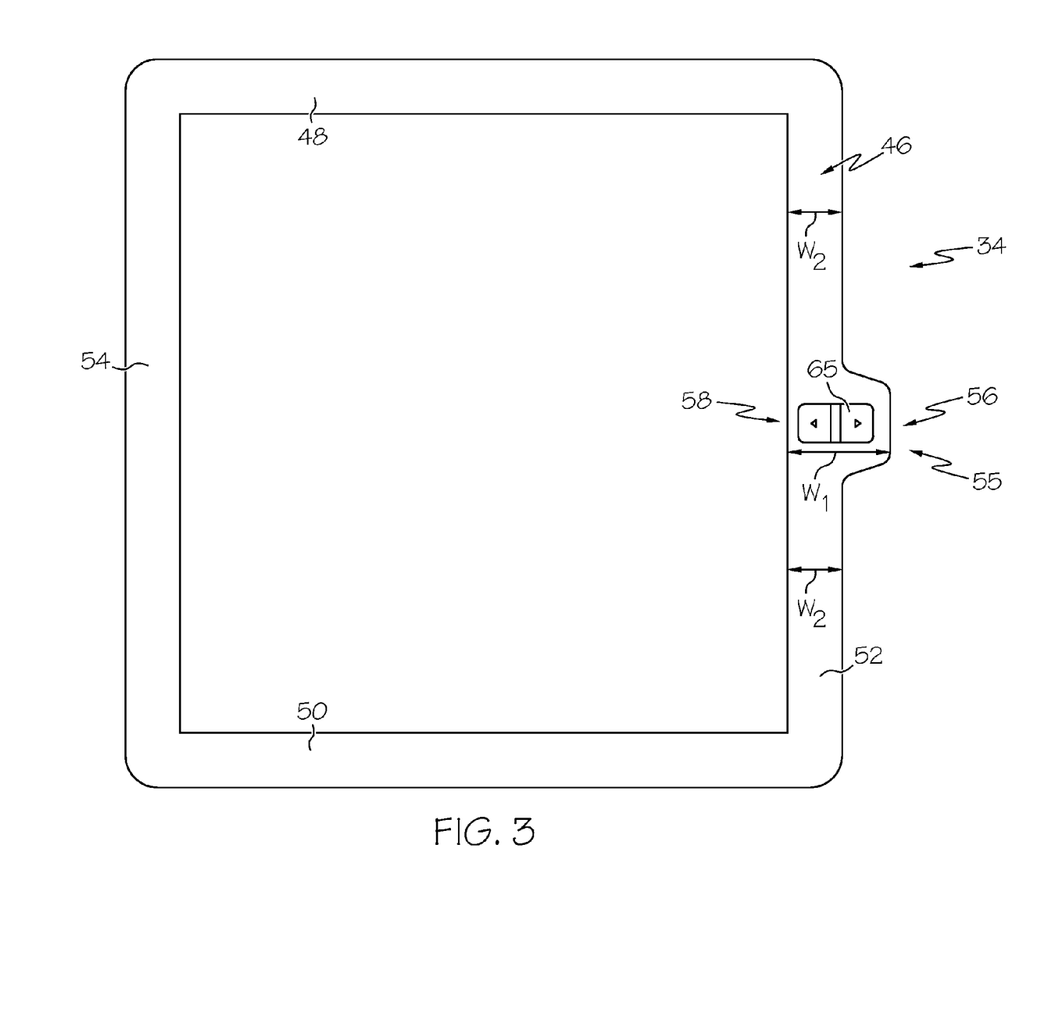
FIG. 3 illustrates an exposed, floor facing side of a moon roof trim ring according to one or more embodiments shown and described herein.

Referring now to FIG. 3, an exposed, floor facing side 46 of the moon roof trim ring 34 is illustrated in isolation. The moon roof trim ring 34 generally forms a ring-shape support that may extend continuously about a periphery of the opening 20 (FIG. 1) and includes side portions 48 and 50, a front portion 52 and a rear portion 54. The moon roof trim ring 34 may be formed of any suitable material or combination of materials, such as plastic and by any suitable process or combination of processes, such as by molding. Located at the front portion 52 (e.g., centrally located on the front portion 52) is a control housing 56 and a control system 58. In some embodiments, a control region 55 of the front portion 52 may have a width $W_1$ that is greater than a width $W_2$ of regions 52 adjacent the control region 55. In other embodiments, the entire front portion 52 may have about the same width. In the illustrated embodiment, the control system 58 includes a control member 65 (e.g., a switch, button, etc.) that is configured to allow the moon roof panel 24 to slide open and closed. In some embodiments, the control system 58 can also control tilting of the sunroof open and closed. In some embodiments, the control system 58 may allow a passenger to control degree of opening of a sunroof in four ways (open, close, tilt-up and tilt-down) or six ways (full-open, full-close, tilt-up, tilt-down, partial-open and partial-close). While the control housing 56 and control system 58 is shown centrally located on the front portion 52, the control housing 56 and control system 58 may be located at other areas, such as at the side portions 48 or the rear portion 54. There may also be more than one control housing 56 and/or control system 58 located on the moon roof trim ring 34.

Figure 4:
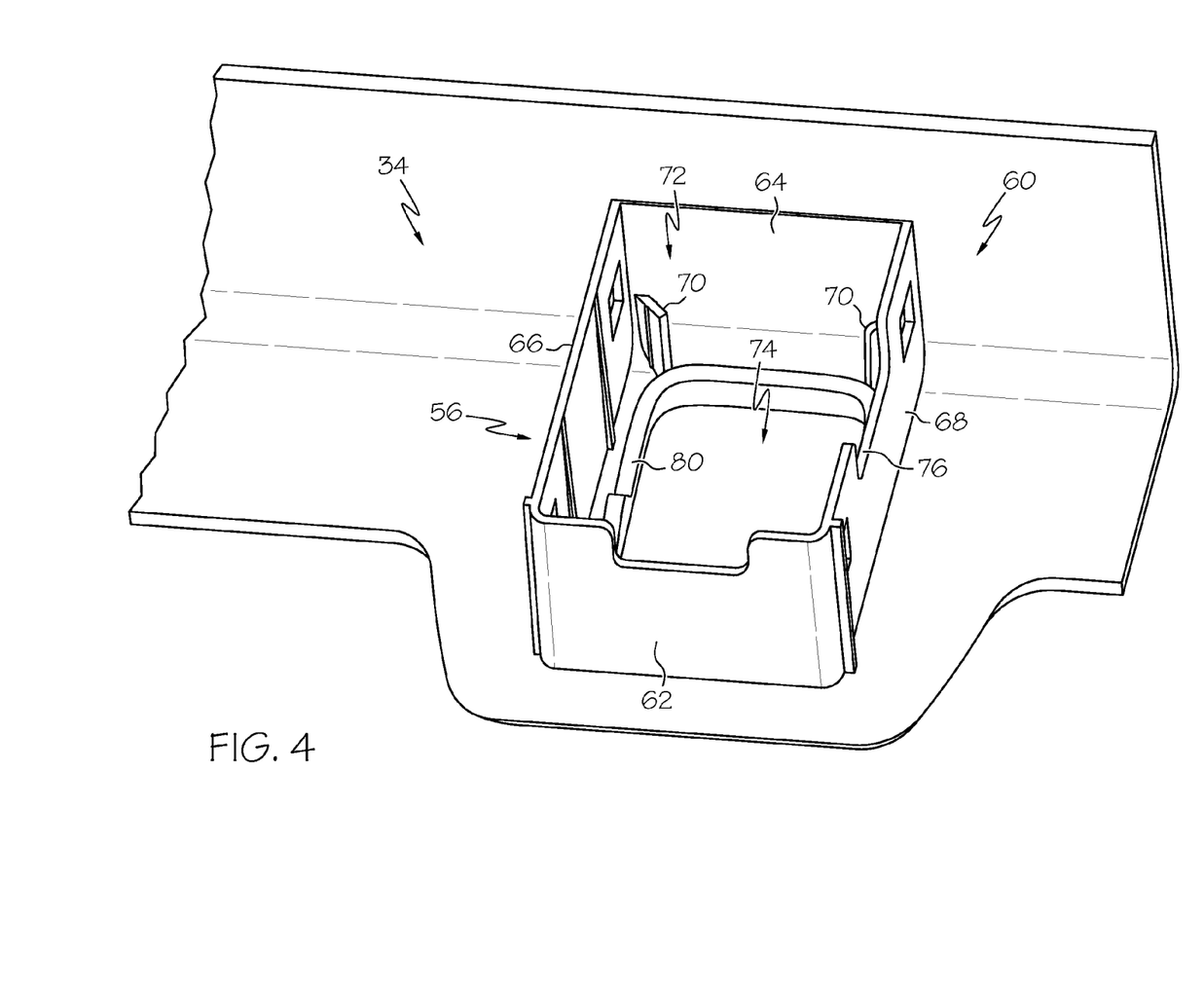
FIG. 4 illustrates a roof facing side of the moon roof trim ring of FIG. 3 according to one or more embodiments shown and described herein.

Referring to FIG. 4, a roof facing side 60 of the moon roof trim ring 34 is illustrated with the control system 58 removed. The control housing 56 may be molded integrally with the rest of the moon roof trim ring 34 and may include a front wall 62, a rear wall 64 and side walls 66 and 68 extending from the rear wall 64 to the front wall 62 forming a volume 72 for receiving and housing the control system 58. In other embodiments, the control housing 56 or portions thereof may be formed separately and attached to the moon roof trim ring 34. Projections 70 may be provided for use in holding the control system 58 securely within the volume 72. An opening 74 is provided through which the control member 65 can be exposed to the interior of the vehicle 10. As can be seen, a ledge 80 extends inwardly into the opening and away from the walls 62, 64, 66 and 68 on which the control system 58 can rest when located in the volume 72. Side wall 68 includes a notch 76 that is sized and arranged to receive an electrical connector 78 of the control system 58.

Figure 5:
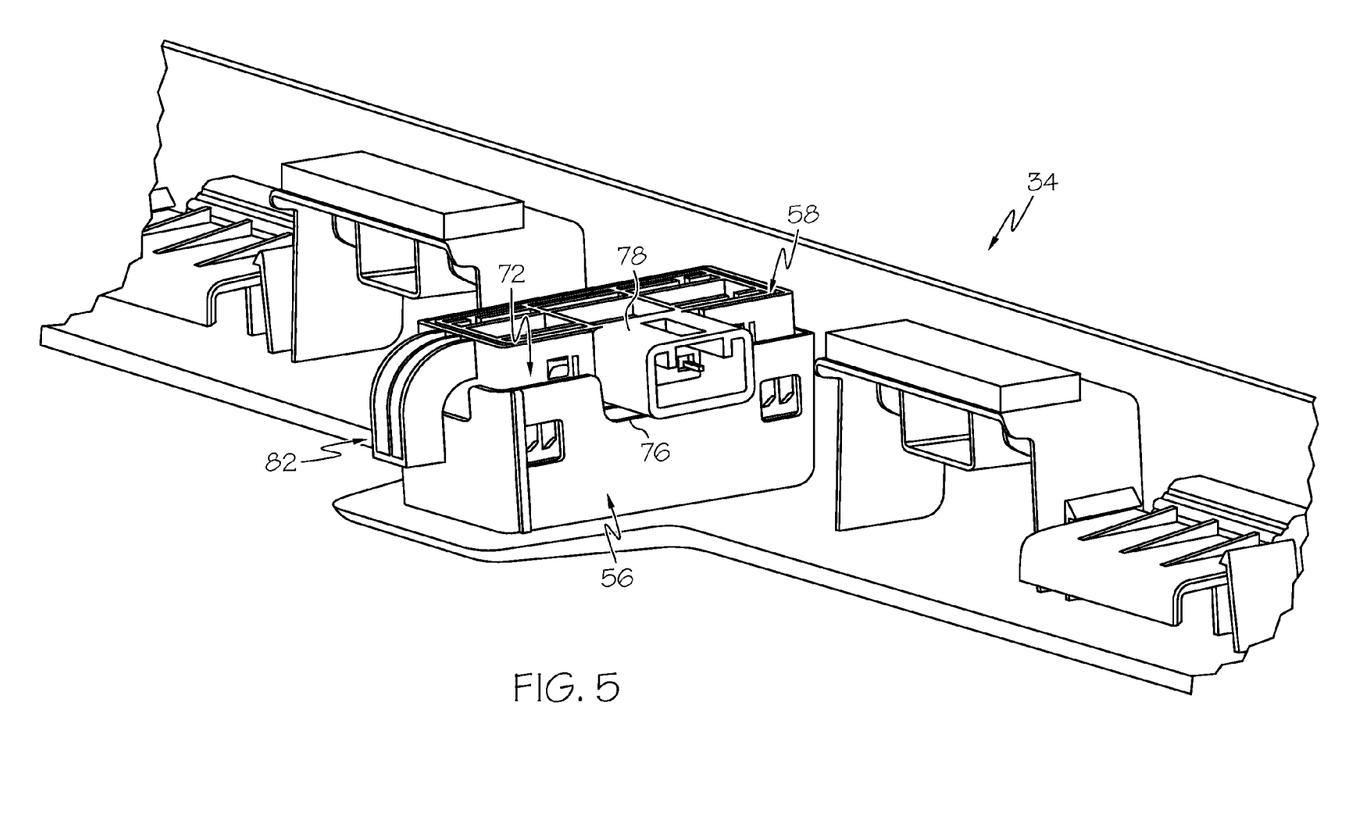
FIG. 5 illustrates a control housing of the moon roof trim ring of FIG. 4 according to one or more embodiments shown and described herein.

Referring to FIG. 5, the control system 58 is illustrated within the volume 72 of the control housing 56. The control system 58 is sized to fit snuggly within the volume 72 with the electrical connector 78 being exposed within the notch 76 for connecting to an electrical line. In some embodiments, the control system 58 may be friction fit into the volume 72 and/or other methods may be used, such as mechanical fasteners, welding, gluing, etc. the control system 58 within the volume 72.

Figure 6:
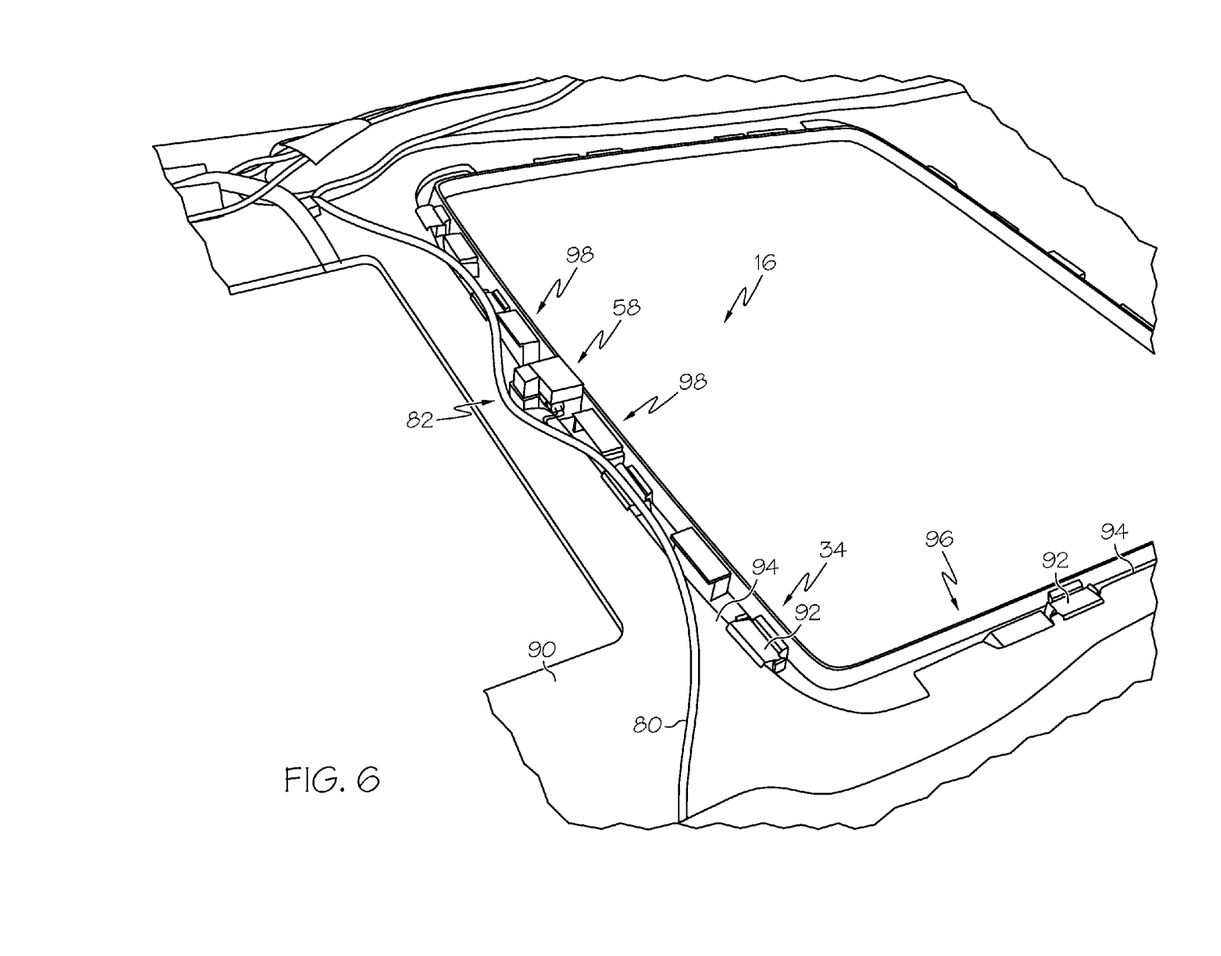
FIG. 6 illustrates a roof facing side of the moon roof trim ring of FIG. 4 attached to a headliner.
Figure 7:
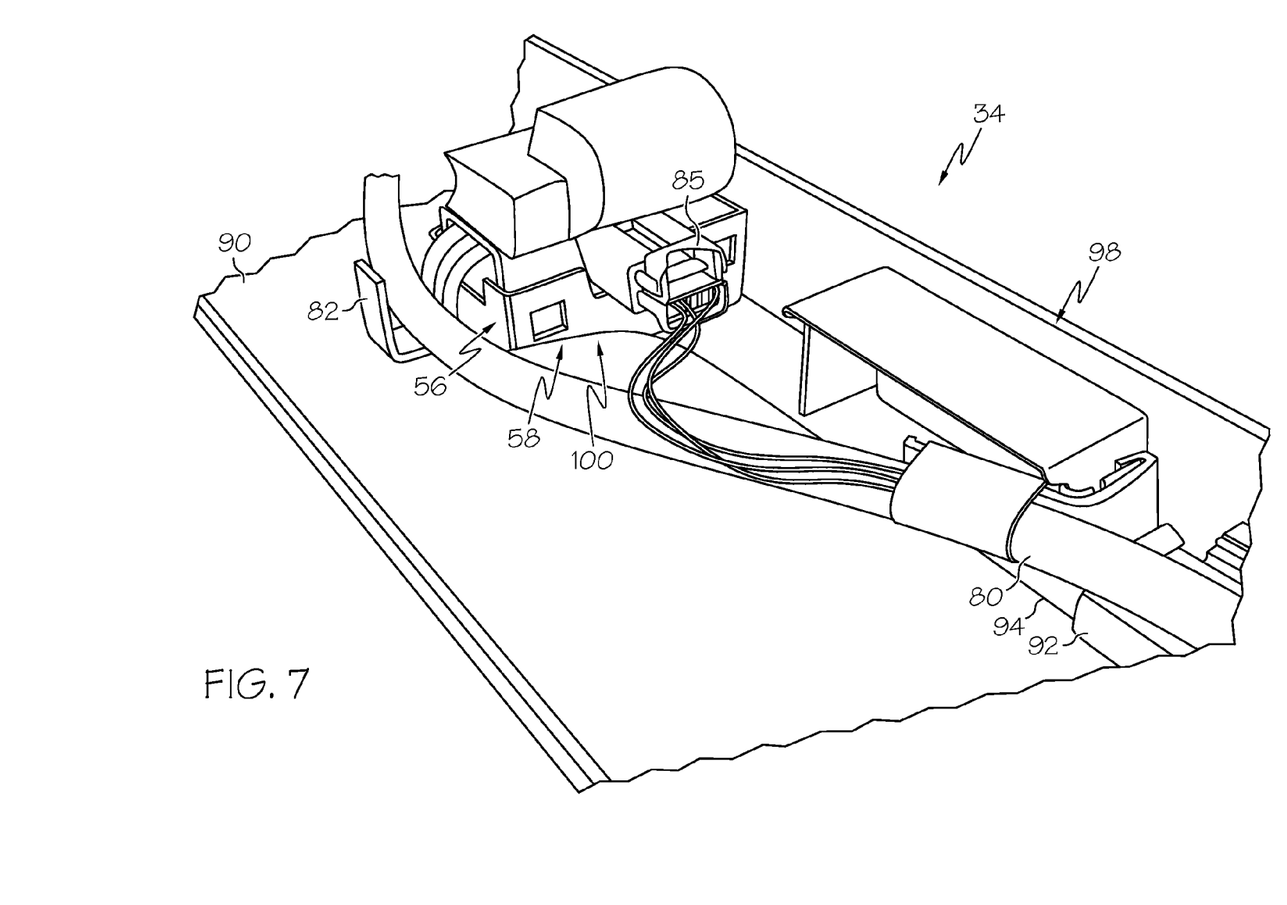
FIG. 7 illustrates another view of the moon roof trim ring of FIG. 4 attached to the headliner.

Referring to FIGS. 6 and 7, the control system 58 is illustrated connected to an electrical line 80 by connector 85 (FIG. 7). The electrical line 80 may include several electrical wires, for example, for power and for connecting control functions of the control system 58 to the moon roof assembly 16 (for opening/closing/tilting the moon roof panel 24). A cable holding feature 82 may also be provided for holding and positioning the electrical line 80 at a position adjacent to the control system 58. In some embodiments, a glue or other material may be used for positioning the electrical line 80.

The moon roof trim ring 34 may be attached to a headliner 90 using any suitable method. In the illustrated embodiment, the moon roof trim ring 34 includes clip members 92 disposed about a periphery of the moon roof trim ring 34 that can be used to catch and rest on ledge portions 94 extending into an opening 96 of the headliner 90. The moon roof trim ring 34 may also include fastener regions 98 (e.g., of hook and loop-type fasteners) that are used to secure the headliner/trim ring assembly to the roof of the vehicle. As can be seen by FIG. 7, the headliner 90 includes a notch region 100 that is used to receive the control housing 56. Any other suitable method or combination of methods can be used to secure the moon roof trim ring 34 to the headliner 90, such as sonic welding, adhesives, mechanical fasteners, etc.

The moon roof assembly 16 is shown having a shape and size intended to cover a portion of the roof area of the vehicle 10, and is substantially surrounded by the moon roof trim ring 34 that can provide structural and functional support to the moon roof assembly 16, and can act as a trim piece for the overhead area of the vehicle 10. The moon roof trim ring 34 may be provided as a single piece, or as multiple pieces configured for interconnection, or as extendable/retractable (e.g. telescoping, etc.) members configured for use with roof panels of varying sizes (e.g. for multiple vehicle programs, etc.). The moon roof trim ring 34 may also be configured for retaining other overhead components, wiring and electrical components, illumination devices, head impact countermeasure (HIC) devices, etc.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A moon roof assembly for a vehicle, comprising:
    an actuator-driven panel having an open position and a closed position;
    a moon roof trim ring at least partially surrounding the panel, the moon roof trim ring including a control housing for supporting a control system; and
    a control system located in the control housing, the control system including a control member that is exposed through an opening in the moon roof trim ring for actuating the control member and moving the panel between the open position and the closed position.

2. The moon roof assembly of claim 1, wherein the moon roof trim ring forms a continuous, closed ring having a front portion, a rear portion and side portions extending from the front portion to the rear portion, the control housing located at a roof-facing side of the front portion.

3. The moon roof assembly of claim 2, wherein the control housing is integrally molded with the front portion of the moon roof trim ring.

4. The moon roof assembly of claim 1, wherein the control housing includes a front wall, a rear wall and side walls extending between the front wall and the rear wall thereby defining a volume for receiving the control system.

5. The moon roof assembly of claim 1 further comprising a cable support feature for securing an electrical cable adjacent the control system.

6. The moon roof assembly of claim 1 further comprising a moveable sunshade having a closed position covering the panel and an open position exposing the panel.

7. A vehicle comprising:
a front moon roof assembly; and
a rear moon roof assembly;
wherein at least one of the front moon roof assembly and the rear moon roof assembly includes a moon roof trim ring at least partially surrounding an actuator-driven panel, the moon roof trim ring including a control housing for supporting a control system for controlling movement of the panel between an open position and a closed position.

8. The vehicle of claim 7, wherein the rear moon roof assembly includes the moon roof trim ring at least partially surrounding the panel, the moon roof trim ring including the control housing for supporting the control system for controlling movement of the panel between the open position and the closed position.

9. The vehicle of claim 8 further comprising a control system located in the control housing, the control system including a control member that is exposed through an opening in the moon roof trim ring for actuating the control member and moving the panel of the rear moon roof assembly between the open position and the closed position.

10. The vehicle of claim 9 further comprising an overhead compartment that houses a front control system configured for controlling the front moon roof assembly.

11. The vehicle of claim 10, wherein the overhead compartment is located above a front seating area of the vehicle and the control housing of the moon roof trim rim is located above a rear seating area of the vehicle.

12. The vehicle of claim 8, wherein the moon roof trim ring forms a continuous, closed ring having a front portion, a rear portion and side portions extending from the front portion to the rear portion, the control housing located at a roof-facing side of the front portion.

13. The vehicle of claim 12, wherein the control housing is integrally molded with the front portion of the moon roof trim ring.

14. The vehicle of claim 13, wherein the control housing includes a front wall, a rear wall and side walls extending between the front wall and the rear wall thereby defining a volume for receiving the control system.

15. The vehicle of claim 14 further comprising a cable support feature for securing an electrical cable adjacent the control system.

16. The vehicle of claim 8 further comprising a moveable sunshade having a closed position covering the panel and an open position exposing the panel.

17. A rear moon roof assembly for a vehicle located above a rear seating area of the vehicle, the rear moon roof assembly comprising:
an actuator-driven panel having an open position and a closed position;
a moon roof trim ring at least partially surrounding the panel; and
a control system including a manually actuatable control member exposed through the moon roof trim ring for controlling movement of the panel between the open position and the closed position.

18. The rear moon roof assembly of claim 17, wherein the moon roof trim ring includes a control housing for supporting the control system.

19. The rear moon roof assembly of claim 18, wherein the moon roof trim ring forms a continuous, closed ring having a front portion, a rear portion and side portions extending from the front portion to the rear portion, the control housing located at a roof-facing side of the front portion.

20. The rear moon roof assembly of claim 19, wherein the control housing includes a front wall, a rear wall and side walls extending between the front wall and the rear wall thereby defining a volume for receiving the control system.

* * * * *